United States Patent
LaBerge (12)

(10) Patent No.: US 6,266,734 B1
(45) Date of Patent: Jul. 24, 2001

(54) REDUCING MEMORY LATENCY BY NOT PERFORMING BANK CONFLICT CHECKS ON IDLE BANKS

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/363,604

(22) Filed: Jul. 29, 1999

(51) Int. Cl.[7] .................................................. G06F 12/00
(52) U.S. Cl. ................................................ 711/5; 711/105
(58) Field of Search ........................... 365/230.03; 711/5, 711/105, 150, 151, 152, 154, 157, 158, 163, 167, 168

(56) References Cited

U.S. PATENT DOCUMENTS

| | | | |
|---|---|---|---|
| 4,745,545 | * 5/1988 | Schiffleger | 364/200 |
| 5,412,788 | * 5/1995 | Collins et al. | 395/425 |
| 5,999,472 | * 12/1999 | Sakurai | 365/222 |
| 6,026,464 | * 2/2000 | Cohen | 711/5 |

* cited by examiner

Primary Examiner—Kevin Verbrugge
(74) Attorney, Agent, or Firm—Trop, Pruner & Hu, P.C.

(57) ABSTRACT

A computer system includes a memory device including banks, and a memory interface coupled to the memory device. The memory interface is adapted to store requests that are associated with the banks. At least two of the requests are copending. The memory interface is adapted to determine whether the banks associated with the copending requests are idle and execute the requests based on the determination.

13 Claims, 6 Drawing Sheets

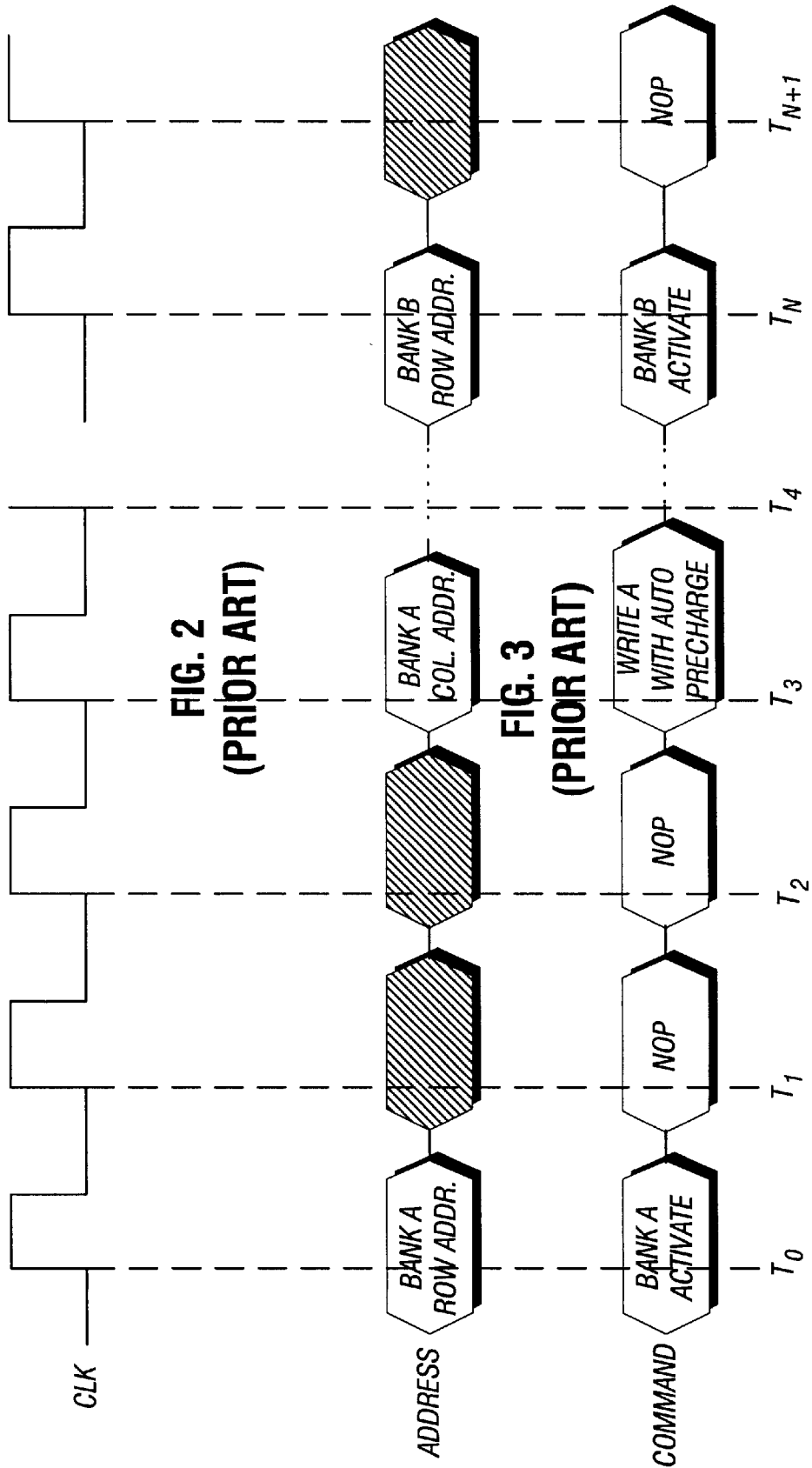

REDUCING MEMORY LATENCY BY NOT PERFORMING BANK CONFLICT CHECKS ON IDLE BANKS

BACKGROUND

The invention relates to processing memory requests that target memory banks.

Many current computer system memory architectures use synchronous random access memories (synchronous RAMs) such as synchronous dynamic random access memories (SDRAMs), SyncLink dynamic random access memories (SLDRAMs), Rambus dynamic random access memories (RDRAMs) and double data rate (DDR) SDRAM memories. The SyncLink standard has been assigned the tentative designation of IEEE-1596.7 by the Microprocessor & Microcomputer Standards Committee (MMSC) of the Institute of Electrical and Electronics Engineers (IEEE). The Rambus® standard is published by Rambus, Incorporated of Mountain View, Calif.

In addition to providing inherently faster operation than previous types of memories, synchronous RAM may generally be organized into memory banks 12, as depicted in FIG. 1. Banks represent a physical compartmentalization of memory space, where each bank may correspond to a unit or array of physical memory. A bank may be further divided into pages, where a page is typically defined in terms of a row address. All those memory locations in a bank having a common row address are said to be on the same page of memory.

One feature of banked memory systems is that consecutive memory access operations to a common page may be performed faster than consecutive memory access operations directed to different pages within the same bank. For example, referring to FIGS. 1, 2, 3 and 4, to write data to a memory location of an idle bank 12a, a memory interface 10 (of a bridge, for example) may drive lines of a memory bus 11 at time $T_0$ with signals that indicate a command to activate a page (of the memory bank 12a) that contains the memory location. Afterwards, the page is deemed "open." Next, the memory interface 10 may furnish signals (at time $T_3$) that indicate a write command and the column address of the memory location. Subsequently, the memory interface 10 may furnish signals that indicate the data to be written to the memory location.

If additional data is to be written to another memory location in the open page, then the memory interface 10 furnishes signals that indicate another write command, the address and the data, as described below. However, for purposes of writing data into another page of the bank 12a, the memory interface 10 must first close the bank 12a via a precharge operation and then activate the bank 12a (via an activate command) to open the other page before proceeding as described above.

The memory interface 10 typically determines whether the next command to be issued to a particular memory bank conflicts with a current state of the bank. For example, the memory interface 10 may receive a memory write request. However, before the memory interface 10 communicates a write command to the memory store data in the targeted bank, the memory interface 10 determines if a bank conflict exists so that the memory interface 10 may take the appropriate action before performing the request. As an example, the targeted memory bank may be precharging and thus, cannot perform the write request. Unfortunately, the bank conflict checks may consume a significant amount of time and generally limit the speed in which a sequence of memory access operations may be performed.

SUMMARY

In one embodiment, a method for use with a computer system includes determining whether a memory bank is idle and receiving a request to perform a pending operation with the memory bank. If the memory bank is idle, the pending operation is performed with the memory bank without determining whether the pending operation conflicts with a state of the bank.

In another embodiment, a memory interface for use with at least one memory device that includes a bank includes a first circuit, a second circuit and a third circuit. The first circuit is adapted to indicate whether the bank is idle, and the second circuit is adapted to determine whether a pending operation with the bank is in conflict with a state of the bank. The third circuit is adapted to perform the pending operation with the bank without using the second circuit if the first circuit indicates the bank is idle.

Advantages and other features of the invention will become apparent from the following description, from the drawing and from the claims.

BRIEF DESCRIPTION OF THE DRAWING

FIGS. 2, 3 and 4 are waveforms of memory bus signals of the prior art.

DETAILED DESCRIPTION

Figure 1:
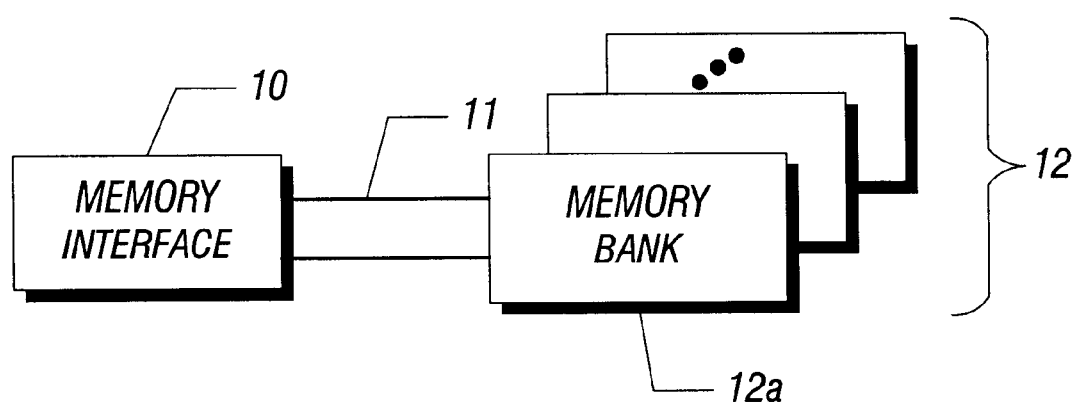
FIG. 1 is a schematic diagram of a memory subsystem of the prior art.
Figure 5:
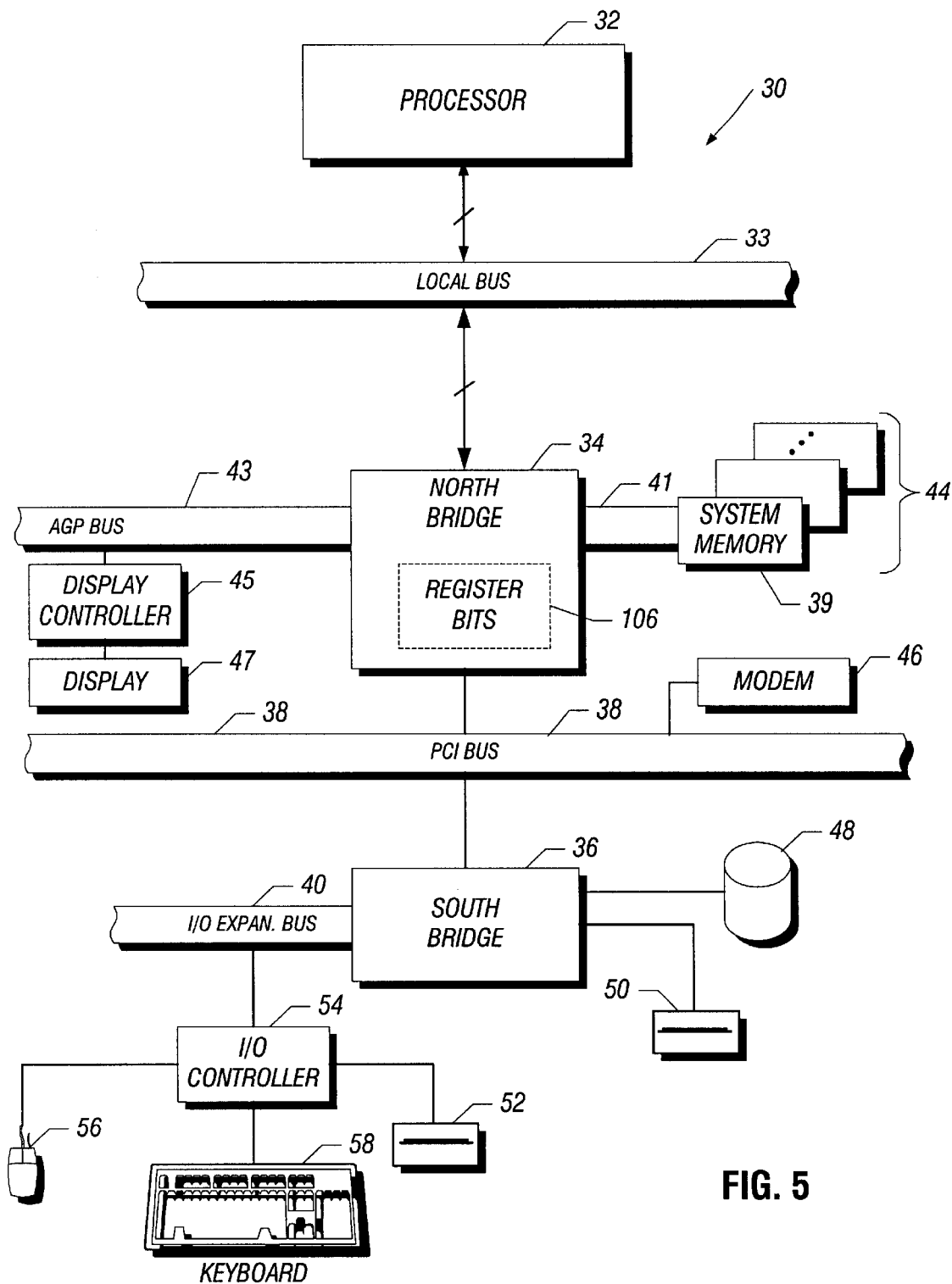
FIG. 5 is a schematic diagram of a computer system according to an embodiment of the invention.

Referring to FIG. 5, an embodiment 30 of a computer system in accordance with the invention includes a north bridge 34 that serves as an interface to communicate data between buses of the computer system 30. For example, the north bridge 34 may receive pending requests (read and write requests, for example) for operations to be performed with a system memory 44. The pending requests may target memory banks 39 of the system memory 44 that are active and memory banks 39 that are idle. For an active bank 39, before performing an operation to fulfill a particular request, the north bridge 34 determines if the pending operation conflicts with a current state of the bank 39.

For example, the pending request may be a write request to write data to a particular page of a targeted bank 39. However, another page of the targeted bank 39 may be open, a condition that requires the north bridge 34 to take the appropriate action before fulfilling this request. Thus, for this scenario, the north bridge 34 determines that a bank conflict exists and remedies the problem by first precharging the targeted bank 39 (to close the open page). Subsequently, the north bridge 34 activates the targeted bank 39 to open the targeted page, and then the north bridge 34 performs a write operation to the targeted bank 39 satisfy the write request.

Another example of a bank conflict may be the following. The north bridge 34 may receive a write request that targets a particular bank 39 that is currently precharging. For this scenario, the north bridge 34 determines that a bank conflict exists and remedies the problem by waiting until the precharging is complete. Subsequently, the north bridge 34 activates the targeted bank 39 to open the targeted page and performs a write operation to satisfy the write request. Many other scenarios that cause bank conflicts are possible.

Unfortunately, the bank conflict checks that are performed by the north bridge 34 may consume clock cycles and thus, may increase the latency between successive memory operations. However, the north bridge 34 reduces the number of bank conflict checks by tracking which banks 39 of the system memory 44 are idle. More particularly, in some embodiments, the north bridge 34 includes register bits 106 that indicate which banks 39 are idle and thus, also indicate which banks are active. Because a bank conflict does not occur if the targeted bank 39 is idle, the north bridge 34 does not perform a bank conflict check if the appropriate bit 106 indicates that a particular targeted bank 39 is idle. As a result, the north bridge 34 eliminates some of the bank conflict checks, thereby reducing latency otherwise incurred between successive memory operations due to these checks. In some embodiments, the number of bits 106 equals the number of banks, and each different bit 106 indicates whether a different associated bank is idle. In other embodiments, the number of bits 106 is less than the number of banks, and each different bit 106 indicates whether a different group of the banks is idle.

Other arrangements are possible, and the grouping of the banks depends on the timing of the system 30. For example, for higher frequency memory buses, the banks may be grouped in fewer groups, as compared to lower frequency memory buses. The timing of the memory bus 41 may be programmed via configurations registers (not shown) of the north bridge 34 and may be used to determine the particular grouping that is used.

Figure 6:
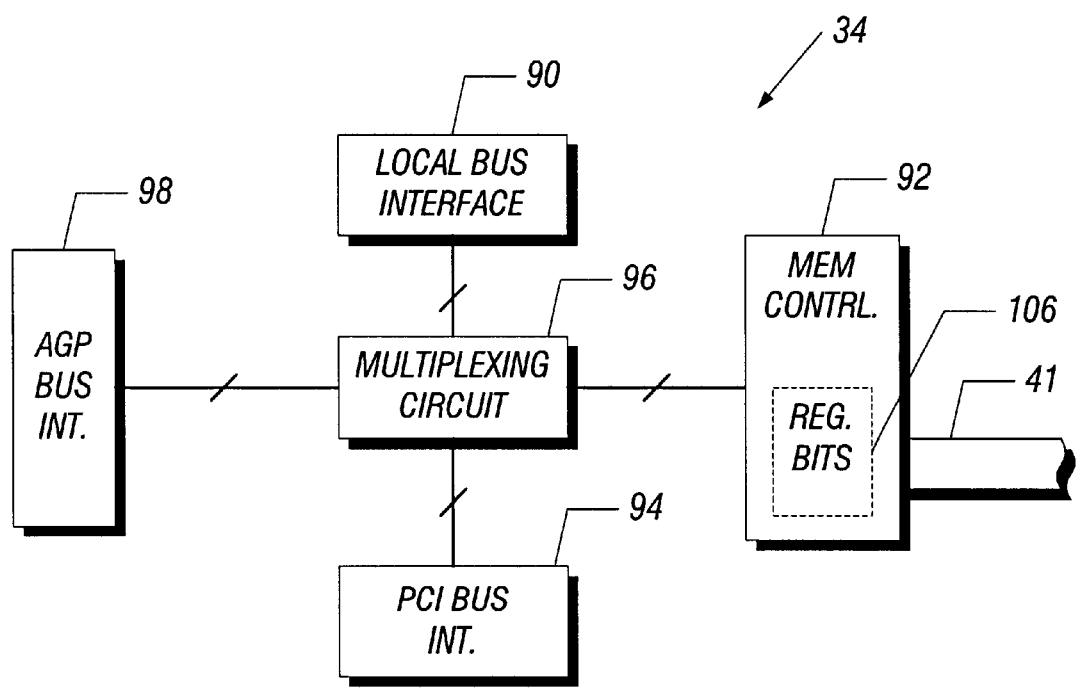
FIG. 6 is a schematic diagram of a bridge circuit of the computer system of FIG. 5 according to an embodiment of the invention.

Referring to FIG. 6, in some embodiments, the bits 106 are part of a memory interface 92 of the north bridge 34. The memory interface 92 communicates via a memory bus 41 with the system memory 44 to perform typical memory operations, such as read, write and refresh operations, for example. The memory interface 92 may also perform bank conflict checks and skip conflict checks for banks that are idle. The memory interface 92 may be coupled to other buses of the computer system 30 via multiplexing circuitry 96. In this manner, a local bus interface 90 (coupled to a local bus 33), an Accelerated Graphics Port (AGP) bus interface 98 (coupled to an AGP bus 43) and a Peripheral Component Interconnect (PIG) bus interface 94 (coupled to a PIG bus 38) may all be coupled together via the multiplexing circuitry 96. The AGP is described in detail in the Accelerated Graphics Port Interface Specification, Revision 1.0, published on Jul. 31, 1996, by Intel Corporation of Santa Clara, Calif. The PIG Specification is available from the PIG Special Interest Group, Portland, Oreg. 97214.

Figure 7:
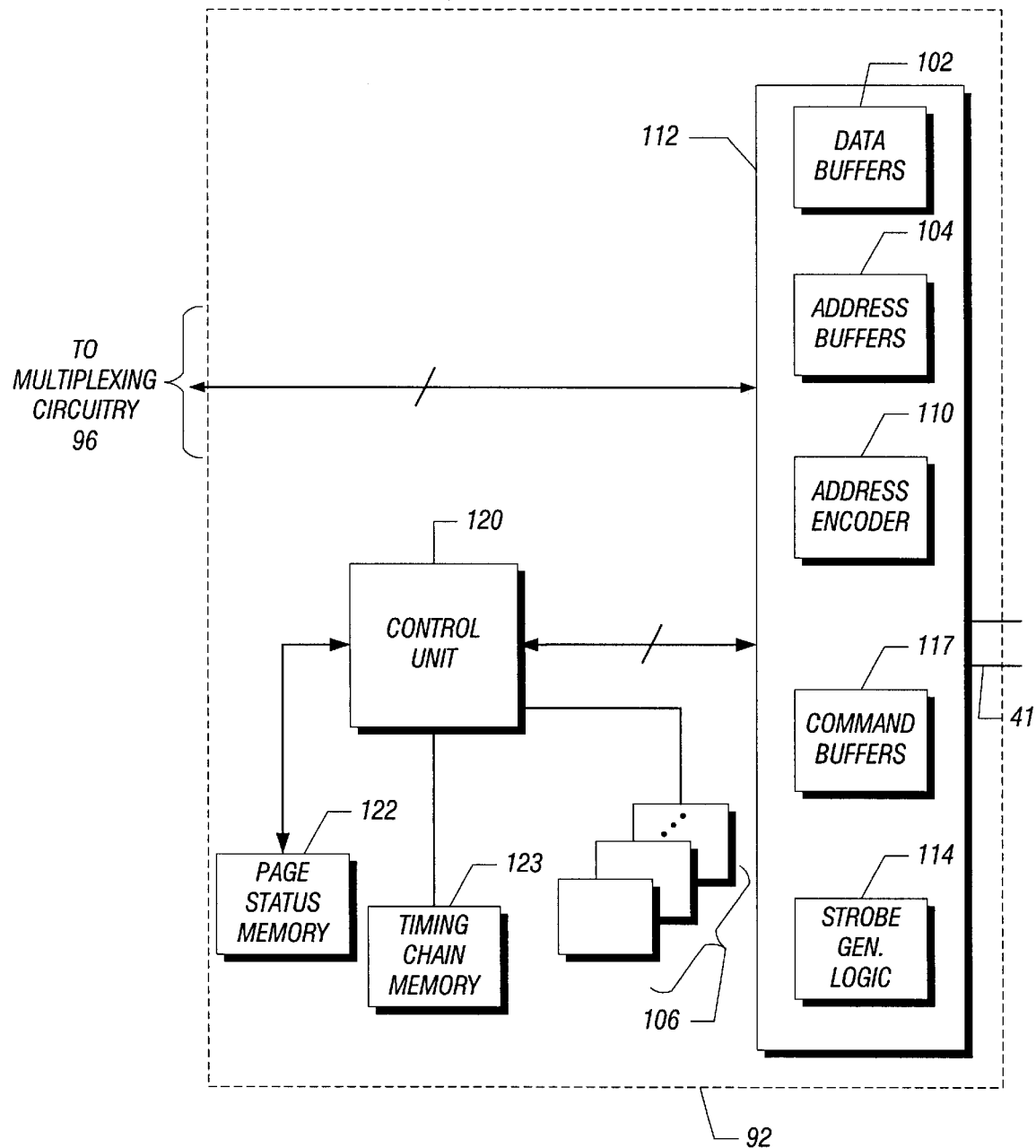
FIG. 7 is a schematic diagram of a memory interface of the bridge of FIG. 6 according to an embodiment of the invention.

Referring to FIG. 7, in some embodiments, the memory interface 92 may include a control unit 120 that controls a memory bus interface 112 that communicates with the memory bus 41, as described below. The memory bus interface 112 includes command buffers 117, data buffers 102 and address buffers 104 to collectively store pending requests that are communicated to the memory interface 92 via the multiplexing circuitry 96. The control unit 120 may also be coupled to the register bits 106.

Figure 8:
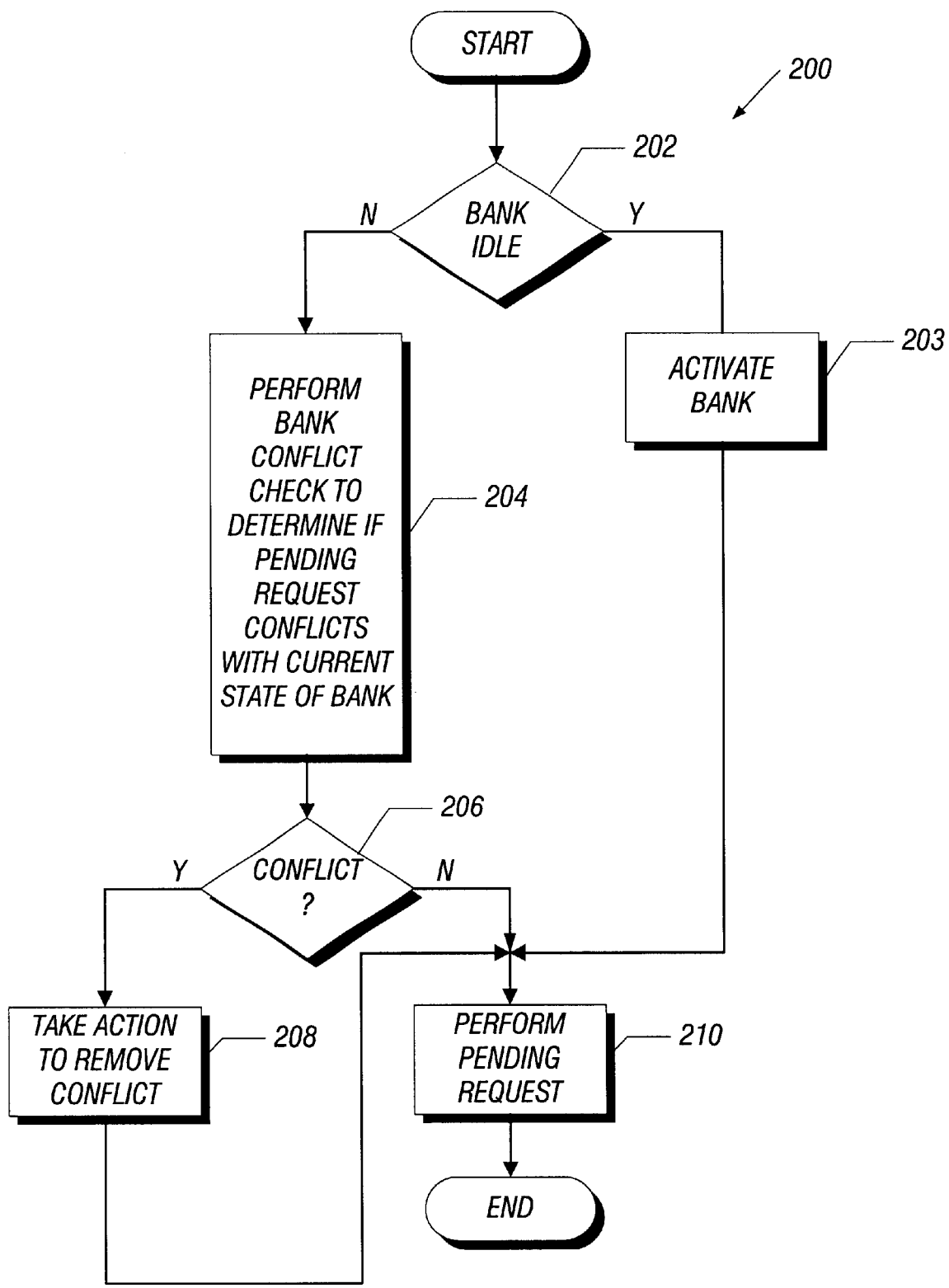
FIG. 8 is a flow diagram illustrating operation of the memory interface.

For a particular request, the control unit 120 first determines which bank 39 is to be accessed. Next, the control unit 120 follows a procedure 200 that is depicted in FIG. 8. First, the control unit 120 determines (diamond 202) whether the targeted bank 39 is idle. If so, the control unit 120 instructs the bus interface 112 to activate (block 203) the targeted bank 39 and subsequently perform the requested operation on the memory bus 41. However, if the bank 39 is not idle, the control unit 120 performs (block 204) a conflict check to determine if the pending request conflicts with a current state of the targeted bank 39.

In this manner, in some embodiments, the control unit 120 may determine the state of the bank by examining the contents of a timing chain memory 123, a memory that stores indications of the most recent operations that have been performed with the bank 39. Thus, if the timing chain memory 123 indicates, for example, that the targeted bank 39 is precharging, then a bank conflict exists. The control unit 120 may also determine if a bank conflict exists by examining the contents of a page status memory 122. For example, if the page that is targeted by the request is closed then the open page of the bank 39 must be closed (i.e., the bank must be precharged) and the closed page must be activated before the requested operation is performed.

Thus, if the control unit 120 determines (diamond 206) that a bank conflict exists, the controller takes (block 208) the appropriate action. Afterwards, the control unit 210 interacts with the bus interface 112 to perform (block 210) the pending request. The control unit 120 updates the timing chain memory 123, the page status memory 122 and the bit registers 106 after each operation.

After the bus interface 112 transmits a command to a bank 39 to precharge (and thus, deactivate) the bank 39, the control unit 120 waits for a predetermined amount of time for the precharge to occur and then sets the appropriate bit to indicate that the bank is idle. Conversely, when the control unit 120 activates a bank 39, the control unit 120 clears the appropriate bit to indicate that the bank 39 is active. Other arrangements are possible.

Referring back to FIG. 7, besides the components mentioned above, the bus interface 112 may also include an address encoder 110 to generate for example, row, column and bank select signals; and strobe generation logic 114 to generate, for example, clock, CAS, RAS and data strobe signals.

Referring back to FIG. 5, besides the north bridge 34 and the system memory 44, the computer system 30 may include a display controller 45 that is coupled to the AGP bus 43 and generates signals for a display 47. The PCI bus 38 may be coupled to a modem 46 and a south bridge 36 that provides an interface to an input/output (I/O) expansion bus 40, a CD-ROM drive 50 and the hard disk drive 48. An I/O controller 54 may be coupled to the I/O bus 40 and receive input data from a mouse 56 and a keyboard 58. The I/O controller 54 may also control operations of a floppy disk drive 52.

In this context of this application, the term "processor" may generally refer to at least one central processing unit (CPU), microcontroller or microprocessor, as just a few examples. The phrase "computer system" may refer to any type of processor-based system, such as a desktop computer or a laptop computer, as just a few examples. Thus, the invention is not intended to be limited to the illustrated computer system 30, but rather, the computer system is an example of one of many possible embodiments.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for use with a computer system, comprising:

determining whether a memory bank is idle;

receiving a request to perform a pending operation with the memory bank;

if the memory bank is idle, performing the pending operation with the memory bank without determining whether the pending operation conflicts with a state of the bank;

if the memory bank is not idle, determining whether the state of the bank conflicts with the pending operation; and performing the pending operation with the memory bank based on said determination of whether the state of the bank conflicts with the pending operation.

2. The method of claim 1, further comprising:

changing a logical state of at least one bit to indicate that the memory bank is idle when the memory bank becomes idle.

3. The method of claim 1, wherein the pending operation conflicts with the state of the bank if the bank needs to be closed before performance of the pending operation.

4. The method of claim 1, wherein the pending operation conflicts with the state of the bank if clock cycles need to elapse before performance of the pending operation to permit completion of another operation.

5. A computer system, comprising:

a memory device including a bank; and a memory interface coupled to the memory device, the memory interface adapted to:

determine whether the bank is idle, receive a request to perform a pending operation with the memory bank, if the memory bank is idle, perform the pending operation with the memory without determining whether the pending operation conflicts with a state of the bank, and if the memory bank is not idle perform the pending operation with the memory bank based on said determination of whether the state of the bank conflicts with the pending operation.

6. The computer system of claim 5, further comprising:

a circuit adapted to change a logical state of at least one bit to indicate that the memory bank is idle when the memory bank becomes idle.

7. The computer system of claim 5, wherein the pending operation conflicts with the state of the bank if the bank needs to be closed before performance of the pending operation.

8. The computer system of claim 5, wherein the pending operation conflicts with said another operation if clock cycles need to elapse before performance of the pending operation to permit completion of said another operation.

9. A memory interface for use with at least one memory device that includes a bank, the memory interface comprising:

a first circuit adapted to indicate whether the bank is idle;

a second circuit adapted to determine whether a pending operation with the bank is in conflict with a state of the bank; and a third circuit adapted to perform the pending operation with the bank without using the second circuit if the first circuit indicates the bank is idle and perform the pending operation with the bank using the second circuit if the first circuit indicates the bank is not idle.

10. The memory interface of claim 9, further comprising:

a register coupled to the first circuit and adapted to indicate whether the bank is idle.

11. The memory interface of claim 10, wherein the register is further adapted to indicate whether at least one other bank is idle.

12. The memory interface of claim 9, wherein the pending operation conflicts with the state of the bank if an additional operation needs to be performed with the memory bank before the performance of the pending operation.

13. The memory interface of claim 9, wherein the pending operation conflicts with said another operation if clock cycles need to elapse before performance of the pending operation to permit completion of said another operation.

* * * * *